United States Patent
Wärnelöv

(10) Patent No.: US 6,900,741 B1
(45) Date of Patent: May 31, 2005

(54) METHOD AND AN APPARATUS FOR IDENTIFICATION AND CONTROL OF HANDLING OF KEYS AND THE LIKE

(76) Inventor: Johnny Wärnelöv, Norrabyvägen 8C, S-573 39 Tranås (SE)

( * ) Notice: Subject to any disclaimer, the term of this patent is extended or adjusted under 35 U.S.C. 154(b) by 381 days.

(21) Appl. No.: 10/070,681

(22) PCT Filed: Sep. 13, 2000

(86) PCT No.: PCT/SE00/01764

§ 371 (c)(1),
(2), (4) Date: Mar. 7, 2002

(87) PCT Pub. No.: WO01/20413

PCT Pub. Date: Mar. 22, 2001

(30) Foreign Application Priority Data

Sep. 15, 1999 (SE) ................................. 9903293

(51) Int. Cl.[7] ................................................ G08G 1/01
(52) U.S. Cl. ..................... 340/933; 340/568.1
(58) Field of Search ............................. 340/933, 568.1, 340/568.2, 568.7, 570, 825.49

(56) References Cited

U.S. PATENT DOCUMENTS

| | | | | |
|---|---|---|---|---|
| 4,549,170 A | | 10/1985 | Serres et al. ................. 340/568 |
| 4,661,806 A | * | 4/1987 | Peters et al. .............. 340/568.1 |
| 4,681,504 A | * | 7/1987 | Welch, Sr. .................. 414/268 |
| 5,038,023 A | * | 8/1991 | Saliga ........................ 235/385 |
| 5,801,628 A | | 9/1998 | Maloney ...................... 340/568 |
| 6,317,044 B1 | * | 11/2001 | Maloney .................. 340/568.1 |
| 6,501,379 B2 | * | 12/2002 | Maloney .................. 340/568.1 |
| 6,648,153 B2 | * | 11/2003 | Holmes .................... 211/85.15 |

FOREIGN PATENT DOCUMENTS

| | | |
|---|---|---|
| EP | 0 104 072 A2 | 3/1984 |
| EP | 0 833 283 A2 | 4/1998 |
| FR | 2 760 557 | 9/1998 |
| GB | 2 146 154 A | 4/1985 |
| WO | 95/04324 | 2/1995 |

* cited by examiner

Primary Examiner—John Tweel, Jr.
(74) Attorney, Agent, or Firm—Davis & Bujold, P.L.L.C.

(57) ABSTRACT

A method and apparatus for identification and control of the handling of keys which will register when a key is removed from and returned to an identification and control device. The identification code of the user is fed into a control center (4) and the identification code is forwarded to a printed circuit card (18) of a local control and indication unit (2) so that the removability and the removal of a key is registered and indicated on the control and indication unit (2) by the control center (4). The identification and control device (3) has a pin-like, hollow shell (26) with a printed circuit card (42) and a chip (43). The chip (43) has a unique code for each identification and control device (3). The hollow shell (26) is inserted into a hole (23) in the local control and indication unit (2) and engages with a contact (19) whereby information is forwarded, via the printed circuit card (42) and the chip (43) of the device (3), to the printed circuit card (18) of the local control and indication unit (2).

7 Claims, 3 Drawing Sheets

METHOD AND AN APPARATUS FOR IDENTIFICATION AND CONTROL OF HANDLING OF KEYS AND THE LIKE

FIELD OF THE INVENTION

The present invention relates to a method for identification and control of the handling of keys. The invention also relates to an apparatus for carrying out the method.

SUMMARY OF THE INVENTION

In offices, factories, hospitals, hotels, security companies, car repair shops and car rental services, mail-carrying companies, shipping agencies, banks, apartment buildings, real estate companies, etc., usually a relatively large number of keys for various properties, apartments, rooms, file cabinets, safe-deposit boxes, cars, etc., are circulated. The keys are used by a fairly large group of people and so far it has been difficult or impossible to keep track of the whereabouts of certain keys/persons at certain points of time. Mistakes and neglects can easily occur, when the key cabinet is used and also when keys are manually handed out and this is registered. Also, all personal handling is very time consuming and expensive.

In order to avoid to a large extent the last mentioned drawbacks electronic circuitries including IC-circuits have already been used, which can identify certain used codes, which are associated with a loose object. However, partly the design of these electronic circuitries is imperfect and limited and partly their applications are defective and impractical, and consequently the security cannot be guaranteed and a reliable survey of the situation is lacking.

U.S. Pat. No. 4,549,170 relates to a system for handling a key panel. The panel is designed for a very large number of, namely, one thousand keys which mutually can and presumably should vary rather strongly (see FIGS. 1 and 2). Each key with its special design will be used in a particular corresponding special opening having a fitting module in said panel (see column 3, lines 9–15).

This may cause a difficult search, in case corresponding numbers are not available. The keys are completely conventional but designed to, when they have been inserted into the panel, trigger an electric contact via their handle or tip or point. A wrong key can of course be inserted into a panel opening, but only if the shape of the opening in depth allows this. The triggered contact is forwarded to an electronic system for various indications. However, the keys are per se not designed to forward any special information from the user or in a reliable way from themselves for the above-mentioned reason. The system must in all likelihood on every occasion be composed in a special way, and quite likely often be recomposed, since locks and keys often are exchanged for other locks and keys. This makes the system not very suitable for a practical usefulness and at least makes it most detailed, inflexible and expensive in manufacturing and maintenance situations.

The object of the present invention is to provide a method of counteracting and, to the utmost possible extent, to eliminate these drawbacks as well as to enhance the state of the art in this field in various additional respects.

These objects are attained according to the present invention by carrying out a method of the invention. Said objects are also attained by designing an apparatus of the kind mentioned in the introduction mainly in the way set forth in the apparatus claim. Thanks to the invention, a robust but still highly sophisticated and completely reliable method of handling, with the greatest imaginary carefulness and reliability, an arbitrary number of keys has been developed. By means of their pin-like shape the identification and control devices protect their sensitive contents to a great extent. Thus, they can be subjected to a rough treatment for an extended time without this having a damaging effect on their functioning. The pin-shape is flexible in all respects and not bulky nor heavy. At the same time, the pin-shape allows, to a large extent is protection of the sensitive parts of a local control unit, since these parts are mounted in a careful way within said unit and are concealed and protected. Despite the fact, that thousands or many thousands of different codes can be stored in the pins, they are uniform and thus they do not cause any problems when keys, users, storage spaces, etc., are exchanged.

BRIEF DESCRIPTION OF THE DRAWINGS

The invention will now be described, by way of example, with reference to the accompanying drawings in which.

DETAILED DESCRIPTION OF THE INVENTION

Figure 1:
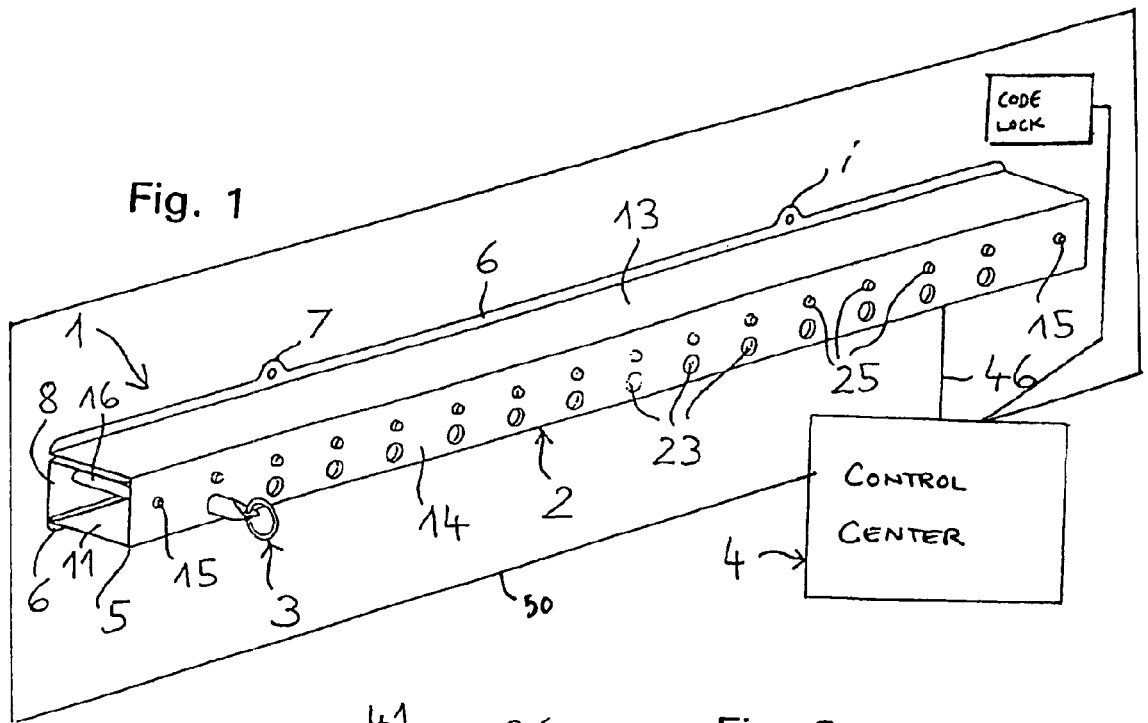
FIG. 1 is an apparatus according to the invention with a perspective view from one end, from above and from the front, of a control and indication unit.
Figure 2:
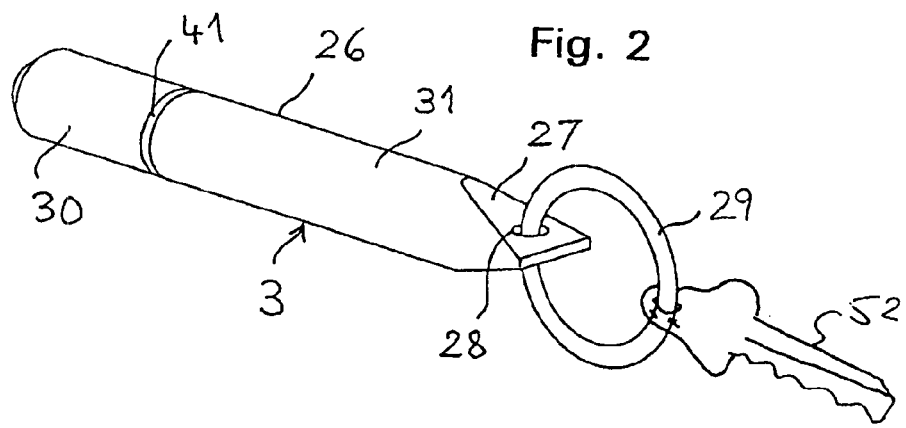
FIG. 2 is a perspective view of the outer end of an identification and control device, which is a part of the apparatus according to FIG. 1.
Figure 3:
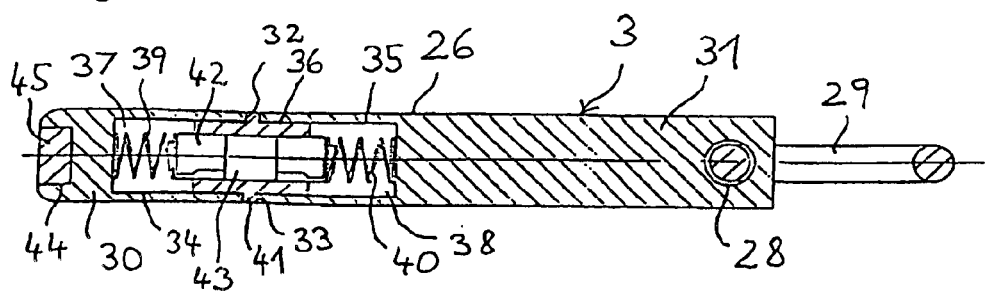
FIG. 3 is a diametrical longitudinal section through the device according to FIG. 2.

An apparatus 1, according to the invention, is shown in its entirety. It comprises three main components, namely, at least one control and indication unit 2, a plurality of identification and control devices 3, designed for the unit 2 as well as a control center 4. Said unit is shown in the drawings as a strip for 14 pin-shaped identification and control devices. The shown strip shape is only one example, which can be replaced by any other suitable shape for the rear or interior side of a key cabinet. The pin shape of said device is also only an example, which can be replaced by any other suitable shape. The number of units and devices can vary within certain limits. Also, more than one center can be used.

Strip or unit 2 comprises a frame work with a U-shaped cross-section made of metal sheet, the free longitudinal edges of legs 11,13 of which end in away from each other directed narrow flanges 6 having a few further outstanding eye fastening means 7 designed to receive screws (not shown) for the fastening of the strip to a wall.

A fastening profile 8 is inserted into the U-profile and has the same longitudinal extension. The fastening profile, which is substantially L-shaped, has a base leg 9, which lies in the same plane as flanges 6, a bearing leg 10, short in profile and being connected to the free longitudinal edge of base leg 9 and designed to bear on the interior side of first leg 11 and the frame work. Second leg 12 of fastening profile 8 runs parallel to second leg 13 of the frame work at a distance inside the same. Bolts 15 extend through front side 14 of frame work 5 and base leg 9, spacing sleeves 16 connect theses two parts to each other to obtain a manageable unit.

Leg 12 of fastening profile 8 carries, via fastening means 17, a unit printed circuit card 18 on its side, which faces leg 11 and the frame work, from which circuit card a contact means 19 projects towards said leg of the frame work, designed as a ribbon, which is parallel to front 14 of the frame work and comprises electric cables, separated from each other (not shown), one cable for each identification and control device. For the rest the electric circuit suitably is closed to printed circuit card 18 via frame work 5, which that portion of device 3 contacts, which is electrically isolated from another portion of device 3, which can be electrically contacted with contact means 19. Printed circuit card 18 is, via a signaling circuit 46, connected to a center 4 and a local PC, a display unit or the like respectively which, in turn, is connected to center 4.

Base leg 9 of the fastening profile carries, via fastening means 20 by means of its side which faces the front of the frame work, a fastener 21 for permanent magnets 22 which project towards the front of the frame work, one for each identification and control device.

The front of the frame work has a number of holes 23, which correspond to said number of identification and control devices 3, suitably having inwardly bent collars 24, designed to provide a guide effect. Also, the front of the frame work is provided with diode lamps 25, connected to printed circuit card 18, fitted into said holes and designed to indicate an authorization and a non-authorization, respectively, when an identification and control device 3 has been fully inserted. Non-authorization or non-availability can be indicated by a red light, whereas authorization or availability can be shown by a green light. Many different possibilities and combinations are of course possible, which hardly need any description in more detail.

In a preferred embodiment, an identification and control device 3 according to the invention comprises a pin-like shell 26 made of a light metal. One end 27, the exterior one of shell 26, can be pointed like a wedge and provided with a hole 28 right through it for receiving a key-ring 29, to which a key 52 is to be fastened.

Shell 26 comprises two parts, one front (inner part) 30 and one rear (outer) part 31. End sides 32, 33, facing each other, of the two parts formed in this way, are each provided with a cylindrical recess 34 and 35, respectively, for receiving a carrier 36 made of an electrically isolating material, e.g., a plastic material. The carrier has a substantially cylindrical shape and fits with press fit with each end into a respective recess, a cavity 37 and 38 respectively remaining, designed to receive screw-shaped electrically conductive compression springs 39, 40. Around the central part of the shell a flange 41 extends, which separates the ends of said parts 30, 31 from each other and consequently is electrically isolating, whereas the axially hollow shell receives a device printed circuit card 42 and a chip 43, which is loaded with a unique code for each identification and control device. A compression spring with its one end abuts each end of said printed circuit card 42, whereas the other end of the compression springs is supported by the respective bottom of said recesses 34, 35. Finally, the end of each device 3, which is the front end in the insertion direction, receives in a recess 44 a steel washer 45, designed to cooperate with one of said permanent magnets via said ribbon 19 and an electric cable in it.

Such an apparatus according to the invention will function in the following fashion: In a typical case, a control and indication unit (the strip) 2 is mounted in a key cabinet 50, locked by means of a code lock, in which a user inserts his code in order to open the cabinet. When the code is inserted, a signal transfer to printed circuit card 18 in addition to a release of the key cabinet door takes place, for each insertion place 23 for an identification and control device (the pin) 3, an authorization designation and/or a non-authorization designation being indicated, e.g., by means of a green illumination of a diode lamp 25 for authorization, whereas for a non-authorization a red illumination of the diode lamp is used. When one or several keys are removed in a proper way, a signal is transferred via the printed circuit card 18 of the strip to said control center 4 having a central printed circuit card, in which the removal is registered and stored. When a removal takes place in an improper way, an alarm signal is transferred in a similar way to said center and forwarded to an alarm device.

Up to the return of the key/the keys it/they and/or the attached pin(s), when a door is unlocked, can send a signal which is registered in said center and/or another center.

When the key/the keys are returned, the respective diodes emit light, when the user has inserted his code, and indicate where the key/the keys is (are) to be inserted, which also is registered in said center.

Via any of said centers, possibly via a connected PC, the user will in each phase be able to see who has removed which keys and possibly also the point of time of removal, unlocking, locking, return, etc. Also, security functions can be integrated, such as the return of keys before a certain point of time.

Figure 4:
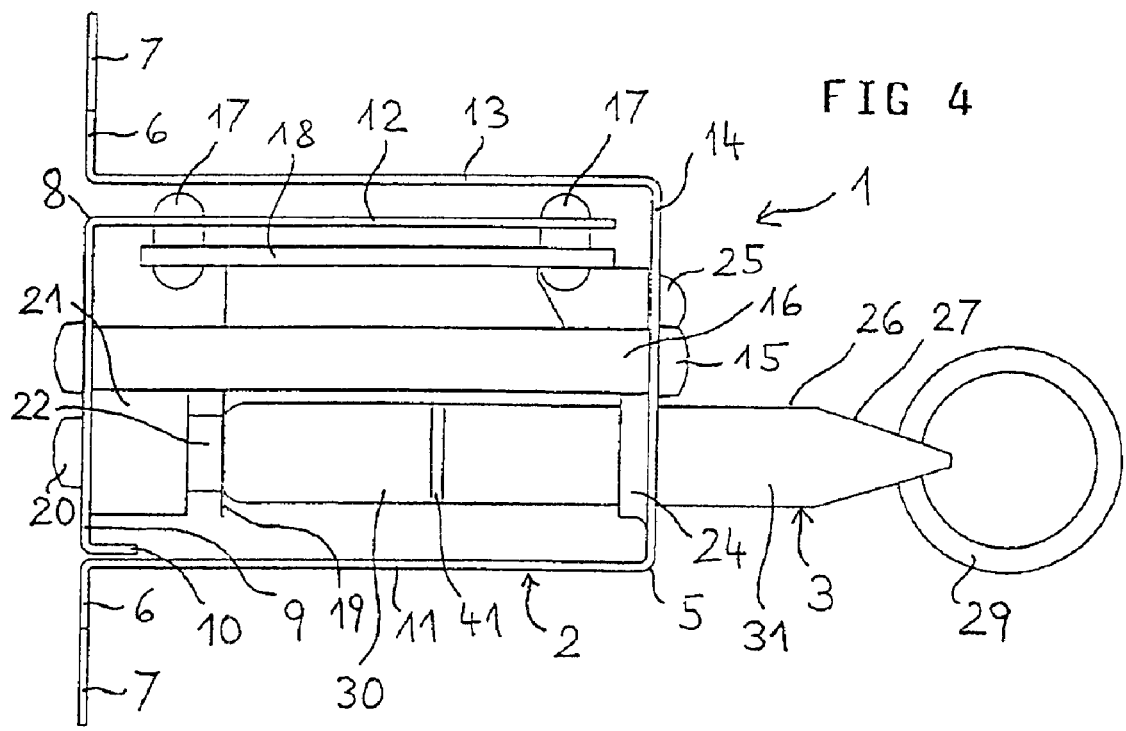
FIG. 4 is the unit according to FIG. 1 in an end view from the left in FIG. 1.
Figure 5:
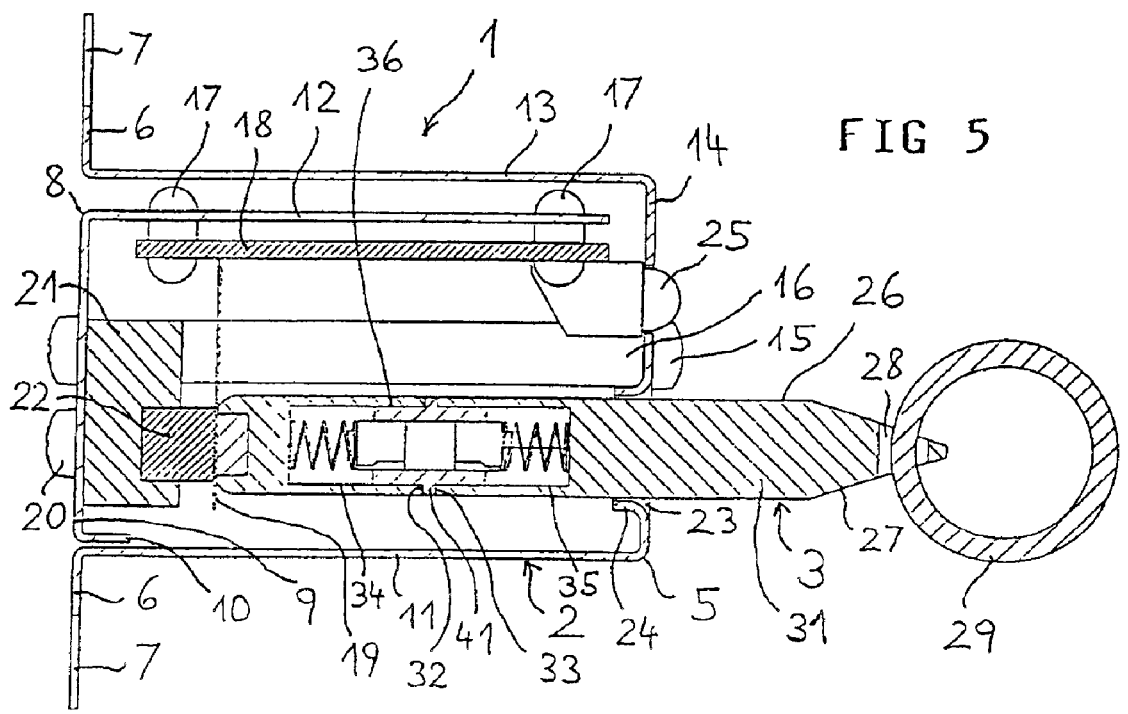
FIG. 5 is a diametrical cross-section of the unit according to FIG. 1.
Figure 6:
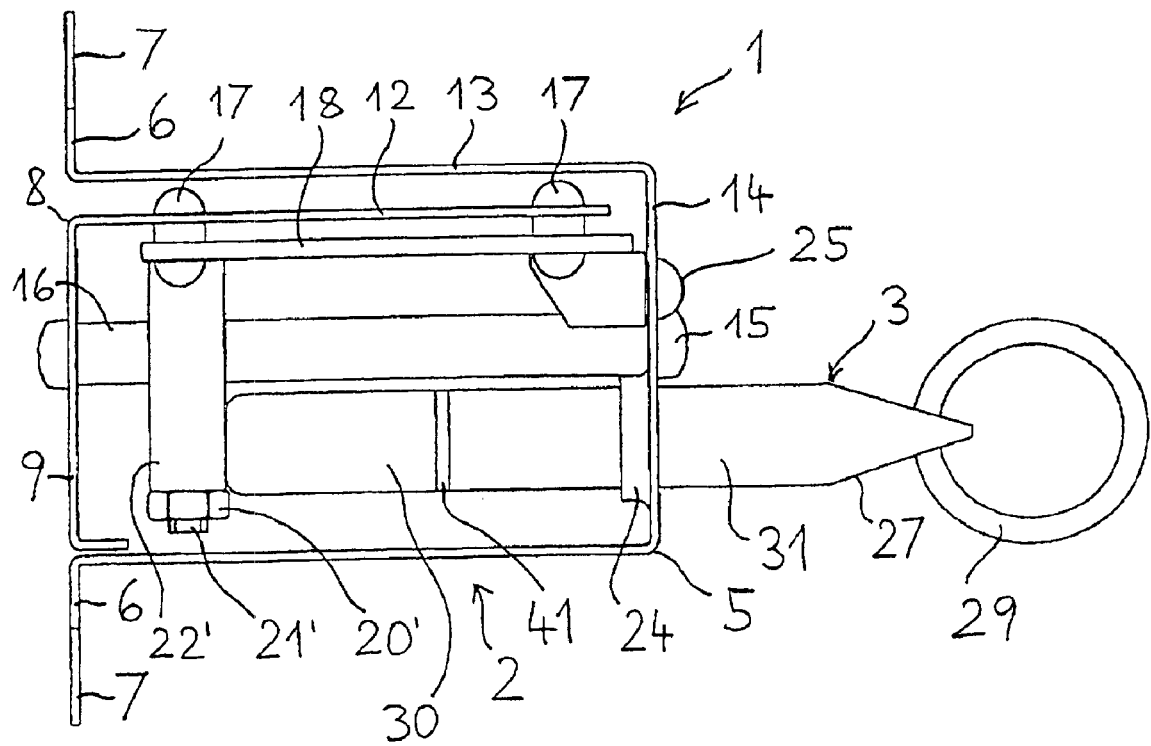
FIG. 6 is a view of a modified apparatus, which is similar to the apparatus shown in FIG. 4.

The apparatus shown in FIG. 6 differs from the apparatus shown in FIGS. 4 and 5, respectively, solely regarding the signal transfer. Permanent magnet 22' is in this case, by means of fastening means 20' and a fastener 21', e.g., a bolt and a nut, fastened to printed circuit card 18, device 3 with its insertion end directly abutting the magnet and the information being transferred from device 3 to circuit card 18. In this case magnet 22' has a double function, namely, partly like before, to secure the correct insertion position of the device by attracting the same, and partly to take over the function as electric contact means 19. Device 3 suitably comprises two metal parts, e.g., a front part made of steel and a rear part made of a lighter metal. Via hole 23 and control collar 24, respectively, in which the material jointly with the rest of the shell also is made of an electric conductive material, e.g., metal, the rear end of device 3 is grounded. As an alternative to this grounding it is possible to let some type of spring radially abut the rear portion of device 3. Collar 24 can, particularly in the latter case, be made of a plastic material. Device 3 can also entirely or partially be made of a plastic material, e.g., a plastic material having conductive portions.

The apparatus according to the invention suitably is provided with a special computer program, which also comprises the possibility of successively adding one or more additional strips or the like to a suitable number of insertion positions. The apparatus, the method and also said computer program allow a mounting of devices 3 in "stationary" or changeable positions. In the latter case, device 3 can be inserted into an arbitrary hole 23. Thanks to printed circuit card 42 of device 3 and chip 43, it is easy for control center 4 to recognize each device 3 as a unique part and to indicate its possibly changed position. In case programming has been done for "stationary" positions and device 3 still is mounted in a position other than the indicated position, the local and/or the central electronic circuitry can indicate the changed position by means of a short buzzer signal. In case still no repositioning of device 3 takes place, its actual position will be registered and it will be indicated at the next inquiry opportunity, i.e., by means of diode lamp 25. In case the user takes the wrong device/key for which the code and the ID of the user is not programmed, the device will issue an alarm signal, preferably initially a "small" alarm signal during a few seconds, in order to allow the user to understand his mistake and reposition device 3, and after 10 seconds a "big" alarm signal. According to a preferred embodiment, a locked cabinet is provided with a code lock and a display (not shown). After writing the correct code the cabinet can be opened. The user can now choose the desired key (one at a time). The keys are, when registered, provided with a name and/or a number. After the writing of a key name and a number, respectively, diode lamp 25 flashes close to the chosen device 3 with the chosen key. In case the desired key already has been removed by another user (empty key position), the user is able to be informed in the display window about who has removed the key. The key positions can be made visible on a PC, which belongs to or is connected to unit 2 and 4 respectively. The user can open a window in order to see the key positions visually. By moving the mouse to an empty key position and clicking the mouse, the user is able to obtain information about who has removed the key and the point of time this occurred.

The present invention is not limited to the embodiments described above and shown in the drawings, respectively, which only are to be regarded as exemplifying embodiments, which can be modified and supplemented in an arbitrary way within the scope of the inventive idea and the accompanying claims. The handling can relate to other items than keys, e.g., tools, documents, medical drugs, etc. The characterizing features of the various embodiments or parts thereof can of course be mutually exchanged. The identification and control devices can of course be sealed or be protected in other ways against trespassing. The keys, i.e., the key rings and the like, can also be included in such a protection. In very special cases the pins can be designed as a part of a key.

What is claimed is:

1. A method of identification and control of handling of keys, the method comprising the steps of:
    associating an identification and control device (3) with each desired key, each identification and control device (3) comprising a pin-like, hollow shell (26) with a device printed circuit card (42) and a chip (43) mounted therein, and the chip (43) having a unique code for each identification and control device (3), and each identification and control device (3) being insertable into a hole (23) in a local control unit (2), the control unit (2) being connected to a control center (4) into which an identification code of a user can be fed whereby the control center (4) transmits the identification code to the control unit (2);
    sending information from the device printed circuit card (42) and the chip (43) of the identification and control device (3) to the unit printed circuit card (18) of the control unit (2);
    registering and indicating, via the control center (4) and the control unit (2), respectively, removal and reinsertion of each respective identification and control device (3);
    mounting the control unit (2) in a key cabinet (50) locked by a code lock which requires a user to enter an identification code in order to open the key cabinet;
    upon the user entering a proper identification code, providing access to the key cabinet and forwarding a signal to the unit printed circuit card (18) of the control unit (2) to indicate, with a diode lamp (25), at least one of:
        each return key position for any removed identification and control device (3);
        each authorized key removal with a green light; and
        each nonauthorized key removal with a red light;
        when an authorized key is removed, sending a signal, via the unit printed circuit card (18), to the control center (4) having a central printed circuit card where such authorized key removal is registered and stored;
        when a non-authorized key is removed, sending an alarm signal, via the unit printed circuit card (18), to an alarm device;
        while access to the key cabinet is provided, registering all key activity of the key cabinet;
        illuminating a corresponding diode, upon a user returning a key and providing an identification code, to indicate where the key is to be returned; and
    indicating, via the control center (4), at least one of:
        an identify of the user removing a key;
        a removal time;
        a return time;
        a key cabinet (50) unlock time;
        a key cabinet (50) lock time; and
        a return of a key before a specific time.

2. An apparatus for key identification and control, the apparatus comprising:
    an identification and control device (3) associated with each desired key, each identification and control device (3) comprising a hollow shell (26) with a device printed circuit card (42) and a chip (43) mounted therein, and the chip (43) having a unique code for each identification and control device (3), and each identification and control device (3) being insertable into a hole (23) in a local control unit (2), the control unit (2) being connected to a control center (4) into which an identification code of a user can be fed whereby the control center (4) transmits the identification code of the user to the control unit (2);
    the device printed circuit card (42) and the chip (43) of the identification and control device (3) being coupled to the unit printed circuit card (18) of the control unit (2) for sending information thereto;
    registering and indicating, via the control center (4) and the control unit (2), respectively, removal and reinsertion of each respective identification and control device (3);
    the control unit (2) being mounting in a key cabinet (50) locked by a code lock which requires a user to enter an identification code in order to access the key cabinet;
    upon the user entering a proper identification code, the key cabinet is accessed and a signal is forwarded to the unit printed circuit card (18) of the control unit (2) to indicate, with a diode lamp (25), at least one of:
        each return key position for any removed identification and control device (3);
        each authorized key removal with a green light; and
        each non-authorized key removal with a red light;
        when an authorized key is removed, the unit printed circuit card (18) sends a signal to the control center (4), having a central printed circuit card, where such authorized key removal is registered and stored;
        when a non-authorized key is removed, the unit printed circuit card (18) sends an alarm signal to an alarm device;
        while the key cabinet is opened, the apparatus registers all key activity thereof;

upon a user returning a key and providing an identification code, the apparatus illuminating a corresponding diode to indicate where the key is to be returned; and the control center (4) indicating at least one of:
an identify of the user removing a key;
a removal time;
a return time;
a key cabinet (50) unlock time;
a key cabinet (50) lock time; and
a return of a key before a specific time.

3. The apparatus according to claim 2, wherein the control unit (2) comprises a strip of a plurality of identification and control devices (3) which each have a fastener (29) at one end thereof for at least one key, the control unit (2) comprises a U-shaped frame work (5) having longitudinal edges of the legs (11, 13) which extend in opposite directions to one another and each terminates in a flange (6) which has a plurality of projecting eyes (7) therein for receiving screws to fasten the control unit (2) to a wall, a U-shaped fastening profile (8) is inserted within the U-shaped frame work (5) and the U-shaped fastening profile (8) has a base leg (9) which lies in a plane defined by the flanges (6), a free longitudinal edge of the base leg (9) has a bearing leg (10) which abuts against the inner surface of one of the legs (11) of the U-shaped frame work (5), the second leg (12) of the U-shaped fastening profile (8) extends parallel to the other leg (13) of the U-shaped frame work (5), a plurality of spacing sleeves (16) separate a front side (14) of the U-shaped frame work (5) from the base leg (9), and bolts (15) fasten the base leg (9) to the U-shaped frame work (5).

4. The apparatus according to claim 3, wherein at least one fastener (17) connects the unit printed circuit card (18) to the second leg (12) of the U-shaped fastening profile (8), a contact (19) extends from the unit printed circuit card (18) toward one of the legs (11) of the U-shaped frame work (5) and the contact (19) comprises a ribbon disposed parallel to the front side (14) of the U-shaped frame work (5), the ribbon comprises at least one electric cable for each one of the identification and control devices (3), and the base leg (9) for the U-shaped fastening profile (8) supports, on a side thereof which faces the front side (14) of the U-shaped frame work (5), a plurality of permanent magnets (22) with one of the plurality of permanent magnets (22) associated with each one of the identification and control devices (3).

5. The apparatus according to claim 4, wherein a front surface of the U-shaped frame work (5) has a plurality of holes (23) therein for receiving one of the identification and control devices (3), each hole has an inwardly bent collar (24) for providing a guiding effect for a respective one of the identification and control devices (3), the front of the U-shaped frame work (5) supports a plurality of diode lamps (25) thereon with each one of the plurality of diode lamps (25) associated with one of the holes (23) and coupled to the unit printed circuit card (18) and, once one of the identification and control devices (3) is fully inserted within a respective one of the holes (23), an associated one of the plurality of diode lamps (25) indicates to a user one of key authorization and key non-authorization.

6. The apparatus according to claim 2, wherein the hollow shell (26) of each one of the identification and control devices (3) is made of metal, an outer end (27) of the shell (26) is provided with a through hole (28) for receiving a key ring (29) to facilitate fastening of at least one key to the identification and control device (3), the shell (26) comprises a front inner part (30) and a rear outer part (31), the front inner part (30) and the rear outer part (31) each have facing cylindrical recesses (34 and 35, respectively) which together receive a carrier (36) made of an electrically isolating material, the carrier has a press fit within the recesses, an electrically isolating flange (41) extends around the center of the shell and separates the front inner part (30) and the rear outer part (31) from one another, a respective compression spring spaces each opposed end of the device printed circuit card (42) from a respective bottom recess, and a leading end of each identification and control device (3) has a recess (44) which supports a steel washer (45), and the steel washer (45) cooperates with the ribbon (19) and one of the plurality of permanent magnets.

7. An apparatus for key identification and control, the apparatus comprising:
an identification and control device (3) associated with each desired key, each identification and control device (3) comprising a hollow shell (26) with a device having a unique code for each identification and control device (3), and each identification and control device (3) being insertable into a hole (23) in a local control unit (2), the control unit (2) being connected to a control center (4) into which an identification code of a user can be fed whereby the control center (4) transmits the identification code of the user to the control unit (2);

the device, having the unique code for each identification and control device (3), being coupled to the unit printed circuit card (18) of the control unit (2) for sending information thereto;

registering and indicating, via the control center (4) and the control unit (2), respectively, removal and reinsertion of each respective identification and control device (3);

the control unit (2) being mounting in a key cabinet (50) locked by a code lock which requires a user to enter an identification code in order to access the key cabinet, and, upon the user entering a proper identification code, access to the key cabinet is provided and a signal is forwarded to the unit printed circuit card (18) of the control unit (2) to indicate, with a diode lamp (25), at least one of:
a return key position for any removed identification and control device (3);
each authorized key removal for a user; and
each nonauthorized key removal for a user;

when an authorized key is removed, the unit printed circuit card (18) sends a signal to the control center (4) which registers and stores such authorized key removal;

when a nonauthorized key is removed, the apparatus activates an alarm device;

upon a user returning a key and providing an identification code, the apparatus illuminating a corresponding diode to indicate where the key is to be returned; and the control center (4) indicating at least one of:
an identify of the user removing a key;
a removal time;
a return time;
a key cabinet (50) unlock time;
a key cabinet (50) lock time; and
a return of a key before a specific time.

* * * * *